United States Patent [19]
Vargiu et al.

[11] 4,132,718
[45] Jan. 2, 1979

[54] PREPARATION OF LIQUID EPOXY RESINS FROM BISPHENOLS

[75] Inventors: Silvio Vargiu, Casatenovo (Como); Mario Pitzalis, Arcore (Milan); Giancarlo Crespolini, Bergamo; Gino Giuliani, Parabiago (Milan), all of Italy

[73] Assignee: Societa' Italiana Resine S.I.R. S.p.A., Milan, Italy

[21] Appl. No.: 748,345

[22] Filed: Dec. 7, 1976

[30] Foreign Application Priority Data

Dec. 19, 1975 [IT] Italy .............................. 30496 A/75

[51] Int. Cl.$^2$ .............................................. C08G 59/06
[52] U.S. Cl. .................................. 260/348.15; 526/68; 528/95
[58] Field of Search ............ 260/47 EP, 348.15, 348.6

[56] References Cited

U.S. PATENT DOCUMENTS

| | | | |
|---|---|---|---|
| 2,801,227 | 7/1957 | Goppel | 260/46 |
| 2,840,541 | 6/1958 | Pezzaglia | 260/47 |
| 2,921,049 | 12/1960 | Moroson | 260/47 |
| 2,995,583 | 8/1961 | Larkin et al. | 260/348.6 |
| 3,069,434 | 12/1962 | Spence et al. | 260/348.6 |

OTHER PUBLICATIONS

Lee & Neville, "Handbook of Epoxy Resins", McGraw-Hill, New York, 1967, pp. 2-10.

*Primary Examiner*—Howard E. Schain
*Assistant Examiner*—E. A. Nielsen
*Attorney, Agent, or Firm*—Sughrue, Rothwell, Mion, Zinn and Macpeak

[57] ABSTRACT

A liquid epoxy resin is produced by gradually feeding an aqueous solution of alkali metal hydroxide into a solution of bisphenol-A in epichlorohydrin, while maintaining the reaction medium at boiling point, distilling off water in the form of an azeotrope with epichlorohydrin and recycling the latter, and maintaining a water content of from 0.1 to 0.7 wt.% and a pH value between 7 and 9 in said reaction medium. The liquid epoxy resins thus obtained have low values of the viscosity, epoxy equivalent and hydrolyzable chlorine content.

13 Claims, No Drawings

PREPARATION OF LIQUID EPOXY RESINS FROM BISPHENOLS

This invention concerns the preparation of liquid epoxy resins by reaction of epichlorohydrin with 2,2-bis(p-hydroxyphenyl) propane (bisphenol-A) in the presence of an alkali metal hydroxide.

This invention particularly concerns the preparation of liquid epoxy resins of low viscosity and with a low hydrolyzable chlorine content, corresponding to the general formula:

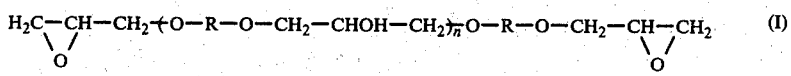

where R is the bisphenyl radical of bisphenol-A (HO-R-OH) and "n" has an average value of from 0 to about 0.07.

Liquid epoxy resins constitute valued products which have many uses in the art. They are used for example in the field of paints and coatings in general, or in the fields of adhesives and binders (cement and bituminous pavements).

These resins also have applications in the electronics field (casting, printed circuits, sealing and encapsulation of electrical parts) as well as in many other fields.

The manufacture of liquid epoxy resins by feeding a concentrated aqueous solution of alkali metal hydroxide into a solution of bisphenol-A in an excess of epichlorodydrin, is known in the art.

Such methods are carried out at atmospheric, or slightly less than atmospheric pressure, the temperature being adjusted so as to distil off continuously the water, introduced with the alkali metal hydroxide, in the form of an azeotrope with the epichlorohydrin, an amount of alkali metal hydroxide greater than the stoichiometric value being used.

After the addition of the alkali metal hydroxide all the residual water is removed, the unreacted epichlorhydrin is removed by distillation at subatmospheric pressure, and the alkali metal chloride (by-product of the reaction) is removed either by dissolving it in water or by filtration.

In the synthesis of liquid epoxy resins from bisphenol-A and epichlorohydrin there are difficulties in obtaining resins of low molecular weight corresponding to Formula (I) where "n" is zero, or at least a value very near to zero.

The liquid epoxy resins obtained by known methods have generally a value of "n" from about 0.15 to 0.30, corresponding to an epoxy equivalent (grams of resin which contain one epoxide group) of from 190 to 210, and a viscosity of from 10,000 to 40,000 cps at 25° C.

Therefore, attempts have been made in the art to reduce the value of "n" in the liquid epoxy resins by various expedients, for example by increasing the molar ratio of the epichlorhydrin to the bisphenol-A in the reaction medium. However, completely satisfactory results with regard to the molecular weight and the viscosity of the resins produced are not obtained.

As is known, a high viscosity is disadvantageous in that it creates difficulties in various application, such as, for example, in casting, and when inert fillers are used.

Liquid epoxy resins made by known methods contain relatively high amounts of hydrolyzable chlorine. As a result, the said resins have a short "pot-life" when hardened with amines.

Short "pot-life" periods result in high release of heat during hardening which may create internal tensions in the manufactured articles which are particularly harmful in applications in the field of electronics (formation of flaws and fractures) and in that of paints, which become easily attacked by corrosive agents.

The methods for preparing liquid epoxy resins described previously result in relatively low reaction yields and the resins thus obtained contain rather high amounts of by-products. These latter are not involved in the hardening reaction of the resin, but remain as inert substances in the manufactured articles, thus adversely affecting their mechanical, thermal and electrical characteristics, and limiting the application fields. For example, in the field of electronics the formation of bubbles with consequent discontinuity in the structure of the manufactured article is particularly harmful, whilst in the paints field cissing and the formation of cracks and other defects is harmful.

It has now been found possible to eliminate, or at least greatly to reduce, these drawbacks and to prepare, with high reaction yields, liquid epoxy resins with low values of the epoxy equivalent and viscosity, with an extremely low hydrolyzable chlorine content and with high "pot-life" values when hardened with amines. Thus, the invention provides a process for the preparation of a liquid epoxy resin by reaction of epichlorohydrin with bisphenol-A in the presence of an alkali metal hydroxide, characterized by:

(a) gradually feeding an aqueous solution of alkali metal hydroxide into a mixture of epichlorohydrin and bisphenol-A in a molar ratio of at least 10:1, until the ratio between the moles of alkali metal hydroxide fed in and the number of phenolic hydroxyl groups in said mixture is from 1:1 to 1.05:1, while maintaining the reaction medium at boiling point, distilling off water in the form of an azeotropic mixture with epichlorohydrin and recycling the distilled epichlorohydrin into the reaction medium, the addition of alkali metal hydroxide and the distillation conditions being so adjusted as to maintain in the reaction medium a content of liquid water of from 0.1 to 0.7 wt.% and a pH value between 7 and 9; and (b) recovering the liquid epoxy resin from the reaction products.

Preferably, the epichlorohydrin/bisphenol-A molar ratio should not exceed 15:1. Values of the said ratio which are less than 10:1 do not give epoxy resins with the desired characteristics, especially as regards the values of the viscosity and the hydrolyzable chlorine content. On the other hand no appreciable improvements are obtained by using epichlorohydrin/bisphenol-A molar ratios greater than 15:1.

The best results are obtained by maintaining said ratio at a value of from 12:1 to 13:1.

The aqueous solution of alkali metal hydroxide is fed in until the ratio between the moles of alkali metal hydroxide and the number of phenolic hydroxyl groups is from 1:1 to 1.05:1, so as not to enhance those secondary reactions which give rise to the formation of undesirable by-products. It should be noted that it was usual in the art to employ a large excess of alkali metal hydroxide with respect to the stoichiometric value (typically an excess of 10–20%), with the object of reducing the hydrolyzable chlorine content in the epoxy resin, with consequent diminutions in yield and formation of undesirable by-products.

Preferably, a concentrated aqueous solution of alkali metal hydroxide is used, for example a solution containing from 40 to 50 wt.% of the said hydroxide.

The hydroxide is preferably sodium or potassium hydroxide.

The fundamental feature of the process of this invention consists in keeping an amount of water of from 0.1% to 0.7% by weight and a pH value between 7 and 9 in the reaction medium, during the addition of alkali metal hydroxide.

It has in fact been found that the use of water contents beyond the indicated range leads to the production of epoxy resins with excessively high values of molecular weight and viscosity. These resins typically have a viscosity at 25° C. greater than 8,000 cps.

On the other hand, use of a pH value greater than 9 brings about undesirable effects similar to those encountered in those known methods in which excess alkali metal hydroxide is used.

The best results are obtained by maintaining in the reaction medium a water content of 0.4 to 0.6% by weight and a pH value between 7 and 8.

The water is continuously removed from the reaction medium in the form of an azeotropic mixture with epichlorohydrin; the vapours thus produced are condensed with separation into two layers, the aqueous layer being discharged and the epichlorohydrin layer being recycled into the reaction medium.

The feed rate of the aqueous solution and the rate of evaporation of the water (reaction water and that introduced with the alkali metal hydroxide) are adjusted so as to maintain the water content and pH of the reaction mass within the ranges of values defined above. The addition of the aqueous alkali metal hydroxide is generally effected in a period of from 3 to 6 hours.

In practice it has been found that these conditions are more easily achieved when the reaction mass is boiled at a pressure of from 150 to 350 mm Hg., and at a temperature of from 70° to 90° C. It has also been found that the best results, as regards all the characteristics of the liquid epoxy resin, are obtained by avoiding, as far as possible, contact of the reaction mass with the alkali metal chloride obtained as a by-product of the reaction.

To this end the reaction mass may be circulated continuously through a self-cleaning filter or a centrifuge, placed outside the reaction zone. This operation is facilitated by the fact that, in view of the working conditions, the alkali metal chloride precipitates in crystalline form and can therefore be removed without too much difficulty.

Upon completion of the alkali metal hydroxide addition, it is generally convenient to keep the mass boiling for a period of time of from 10 to 20 minutes, thus removing the residual water.

Finally the liquid epoxy resin is recovered from the reaction products by conventional methods. Thus, for example, water can be added to the reaction products to wash out the alkali metal chloride. The aqueous phase is then separated from the organic phase consisting of a solution of the liquid epoxy resin in epichlorohydrin. Obviously this operation may not be necessary when the alkali metal chloride is removed in the course of the reaction.

The unreacted epichlorohydrin is then distilled off, and it is generally convenient to filter off the distillation residue so as to remove any inorganic compound present.

The liquid epoxy resins thus obtained correspond to formula (I) with an average value of "n" from zero to 0.07, corresponding to an epoxy equivalent value of from 170 to 180.

The said resins have a viscosity of from 6,000 to about 8,000 cps, measured at 25° C., and a hydrolyzable chlorine content of from 0.1 to 0.45% by weight when a stoichiometric amount of sodium hydroxide is used and from 0.1 to 0.02% by weight when a molar amount of the said sodium hydroxide up to 5% in excess of the stoichiometric amount is used.

The value of the "pot-life", measured at 25° C. on a mixture of 90 parts of resin and 10 parts of triethylenetetramine, is of the order of 40–60 minutes when the hydrolyzable chlorine content in the liquid epoxy resin is from 0.1 to 0.45% by weight, and rises to 90–100 minutes when the said hydrolyzable chlorine content is from 0.1 to 0.02% by weight.

The reaction yields based on the converted epichlorohydrin are in each case 95% or more, whereas in known methods in which an excess of sodium hydroxide of 10–20% over the stoichiometric value is used, these yields are of the order of 85–90%.

EXAMPLES 1–13

One uses an apparatus comprising a reaction vessel (flask), mechanical agitator, electric heater, distillation column, a condenser, a separator for the epichlorohydrin-water distillate fitted with a siphon for recycling the epichlorohydrin, and a system for regulating the pressure in the reaction vessel.

3,000 parts by weight of epichlorohydrin and 585 parts by weight of bisphenol-A (12.6:1 molar ratio) are fed into the flask.

The pressure in the apparatus is regulated to the desired value and the mass is gradually heated to boiling point.

Then 420 parts by weight of a 49% by weight aqueous solution of sodium hydroxide are introduced gradually over a period of about 5 hours. Upon completion of this addition, the ratio of the number of moles of sodium hydroxide added to the number of phenolic hydroxyl groups is 1.00:1.

During the addition of sodium hydroxide, the water is removed from the boiling mass in the form of an azeotropic mixture with epichlorohydrin. The resultant vapours are condensed, the denser epichlorohydrin layer is recycled and the aqueous layer is discharged.

In each case the conditions are so regulated as to maintain the water content of the reacting mass at the desired value.

After the addition of the sodium hydroxide the mass is kept boiling for a further 15 minutes. Then about 500 parts by weight of water are added, the mass is agitated for 20 minutes and the aqueous phase removed by decantation, operating at about 50° C.

The organic phase is distilled, working first at atmospheric pressure and then at subatmospheric pressure (about 10 mm Hg) in order to remove the unreacted epichlorohydrin completely.

The distillation residue is finally filtered to remove any residual inorganic salts, using diatomaceous earth as a filter aid.

The liquid epoxy resin thus obtained is tested to determine its properties, and the results are recorded in the Table.

More particularly in the said Table are recorded:
under (A) the operating pressure in mm Hg;
under (B) the temperature of the reacting mass;
under (C) the average pH of the reacting mass;
under (D) the average percentage by weight of water present in liquid form in the reacting mass, the determination being carried out by the Karl Fischer method;
under (E) the rate of distillation expressed in ml of distillate per hour.

The values given in the Table under (A), (B), (C), (D) and (B) are taken during the addition of the aqueous sodium hydroxide.

In the said Table are recorded:
under (F) the viscosity of the epoxy resin at 25° C. expressed in cps;
under (G) the epoxy equivalent of the resin, as previously defined;
under (H) the corresponding value of "n" with reference to formula (I);
under (I) the hydrolyzable chlorine content expressed as a percentage by weight of the resin;

Example I is for comparison in that the water content in the reacting mass is less than the minimum value.

Examples 9 to 13 are also for comparison in that the said water content is greater than the maximum limit.

Examples 2 to 8 were carried out according to the process of the invention.

Table

| Ex. | (A) | (B) | (C) | (D) | (E) | (F) | (G) | (H) | (I) |
|---|---|---|---|---|---|---|---|---|---|
| 1 | 760 | 112 | 7.0 | 0 | 500 | 10700 | 190 | 0.14 | 0.68 |
| 2 | 250 | 86 | 7.8 | 0.1 | 1000 | 7965 | 176 | 0.04 | 0.45 |
| 3 | 250 | 82 | 7.9 | 0.22 | 440 | 7843 | 180 | 0.07 | 0.29 |
| 4 | 200 | 75 | 6.7 | 0.24 | 1100 | 7578 | 181 | 0.07 | 0.28 |
| 5 | 350 | 90 | 7.5 | 0.25 | 490 | 7107 | 178 | 0.05 | 0.15 |
| 6 | 160 | 70 | 8.0 | 0.25 | 1120 | 6924 | 170 | 0 | 0.16 |
| 7 | 160 | 70 | 7.2 | 0.43 | 500 | 6127 | 173 | 0.02 | 0.12 |
| 8 | 250 | 80 | 8.8 | 0.58 | 150 | 6200 | 170 | 0 | 0.12 |
| 9 | 350 | 90 | 10 | 0.8 | 92 | 9800 | 186 | 0.11 | 0.61 |
| 10 | 450 | 100 | 9.2 | 1.1 | 84 | 10200 | 194 | 0.17 | 0.95 |
| 11 | 250 | 80 | 7.6 | 1.4 | 113 | 10120 | 189 | 0.13 | 0.85 |
| 12 | 760 | 110 | 14 | 4.1 | 190 | 11519 | 185 | 0.10 | 0.80 |
| 13 | 760 | 115 | — | 5.0 | 140 | — | 192 | 0.15 | 0.95 |

EXAMPLE 14 (COMPARISON)

Example 1 is repeated, using a 5% excess molar amount of sodium hydroxide with respect to the number of phenolic hydroxyl groups in the bisphenol-A feed.

A liquid epoxy resin is obtained with a hydrolyzable chlorine content of 0.3% by weight, whilst the other characteristics of the said resin remain practically unchanged.

EXAMPLES 15–21

Examples 2 to 8 are repeated using a 5% excess molar amount of sodium hydroxide with respect to the number of phenolic hydroxyl groups in the bisphenol-A feed.

Liquid epoxy resins are obtained with a hydrolyzable chlorine content of from 0.02 to 0.09% by weight, whilst the other characteristics remain practically unchanged.

EXAMPLES 22–26 (COMPARISON)

Examples 9 to 13 are repeated using a 5% excess molar amount of sodium hydroxide with respect to the number of phenolic hydroxyl groups in the bisphenol-A feed.

Liquid epoxy resins are obtained with a hydrolyzable chlorine content of 0.1–0.4% by weight whilst the other characteristics remain practically unchanged.

In Examples 14 and 22–26 the Hazen colour of the liquid epoxy resin is of the order of 200; in Examples 15–21 the Hazen colour is of the order of 80–120.

EXAMPLE 27

The apparatus described in the previous Examples is used, the flask being filled with 3,000 parts by weight of epichlorohydrin and 585 parts by weight of bisphenol-A (12.6:1 molar ratio).

The pressure in the apparatus is regulated to 160 mm Hg and the mixture is heated to boiling point.

439 parts by weight of a 49% by weight aqueous solution of sodium hydroxide are gradually introduced over 5 hours, the ratio between the moles of sodium hydroxide fed in and the number of hydroxyl groups being then of 1.048:1. During this addition the water is removed in the form of an azeotrope with epichlorohydrin and the distilled epichlorohydrin is recycled.

Moreover the sodium chloride is formed as a by-product of the reaction, is removed by circulating the reaction mass continuously through a centrifuge placed outside the reactor.

After the addition of the sodium hydroxide solution, the unreacted epichlorohydrin is distilled off and the distillation residue is filtered in the manner already described.

Thus a liquid epoxy resin is obtained having the following characteristics:
epoxy equivalent: 172
viscosity at 25° C. (cps): 7,000
hydrolyzable chlorine (% by weight): 0.003
"pot-life" at 25° C. (minutes): 100
Hazen colour: 60
volatile substances (% by weight): 0.6

The reaction yield is equal to 95.3% of the theoretical.

The liquid epoxy resin is represented by Formula (I) with "n" equal to 0.014.

EXAMPLE 28

Example 27 is repeated, 420 parts by weight of an aqueous 49% by weight solution of sodium hydroxide being fed in.

The liquid epoxy resin thus obtained has a hydrolyzable chlorine content equal to 0.06% by weight whilst the other characteristics are practically unchanged.

What we claim is:
1. A method for the preparation of a low viscosity, low hydrolyzable chlorine content liquid epoxy resin corresponding to the general formula:

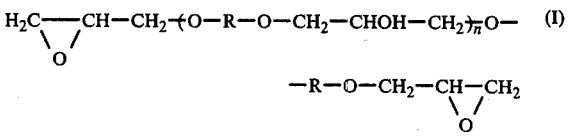

wherein R is the bisphenyl radical of bisphenol-A and n has an average value of from 0 to about 0.07 by reaction of epichlorohydrin with bisphenol-A in the presence of an alkali metal hydroxide, with comprises: (a) gradually feeding an aqueous solution of alkali metal hydroxide into a mixture of epichlorohydrin and bisphenol-A in a molar ratio of at least 10:1, until the ratio between the moles of alkali metal hydroxide fed in and the number of phenolic hydroxyl groups in said mixture is from 1:1 to 1.05:1, while maintaining the reaction medium at boiling point, distilling off water in the form of an azeotropic mixture with epichlorohydrin and recycling the distilled epichlorohydrin into the reaction medium, the addition of alkali metal hydroxide and the distillation conditions being so adjusted as to maintain in the reaction medium a content of liquid water of from 0.1 to 0.7 wt.% and a pH value between 7 and 9, wherein the reaction medium is boiled at a temperature of from 70° to 90° C. and at a pressure of from 150 to 350 mm Hg; and (b) recovering the liquid epoxy resin from the reaction products.

2. The method of claim 1, wherein said molar ratio between epichlorohydrin and bisphenol-A does not exceed 15:1.

3. The method of claim 1, wherein said molar ratio between epichlorohydrin and bisphenol-A is from 12:1 to 13:1.

4. The method of claim 1, wherein said alkali metal hydroxide is selected from the group consisting of sodium and potassium hydroxides.

5. The method of claim 1, wherein said aqueous solution contains from 40 to 50 wt.% of alkali metal hydroxide.

6. The method of claim 1, wherein said water content is maintained at a value of from 0.4 to 0.6 wt.% and said pH at a value between 7 and 8.

7. The method of claim 1, wherein said aqueous solution is added for a period of from 3 to 6 hours.

8. The method of claim 1, wherein the reaction medium is kept boiling for a period of from 10 to 20 minutes upon completion of the alkali metal hydroxide addition, thus distilling off the residual water present in said medium.

9. The method of claim 1, wherein during said addition the reaction medium is continuously circulated through a self-cleansing filter or a centrifuge, thereby to substantially remove the alkali metal chloride which forms as a by-product of the reaction.

10. The method of claim 1, wherein said water is continuously removed throughout the process.

11. The method of claim 1, wherein said liquid epoxy resin has a viscosity of from 6,000 about 8,000 cps, measured at 25° C.

12. The method of claim 1, wherein n is 0.

13. The method of claim 11, wherein said alkali metal hydroxide is sodium hydroxide and wherein said liquid epoxy resin has a hydrolizable chlorine content of from 0.1 to 0.02% by weight, the molar amount of said sodium hydroxide being up to 5% in excess of the stoichiometric amount.

* * * * *